March 30, 1937.  F. C. BRAUN  2,075,006
EASEL SPRAY
Filed May 11, 1935
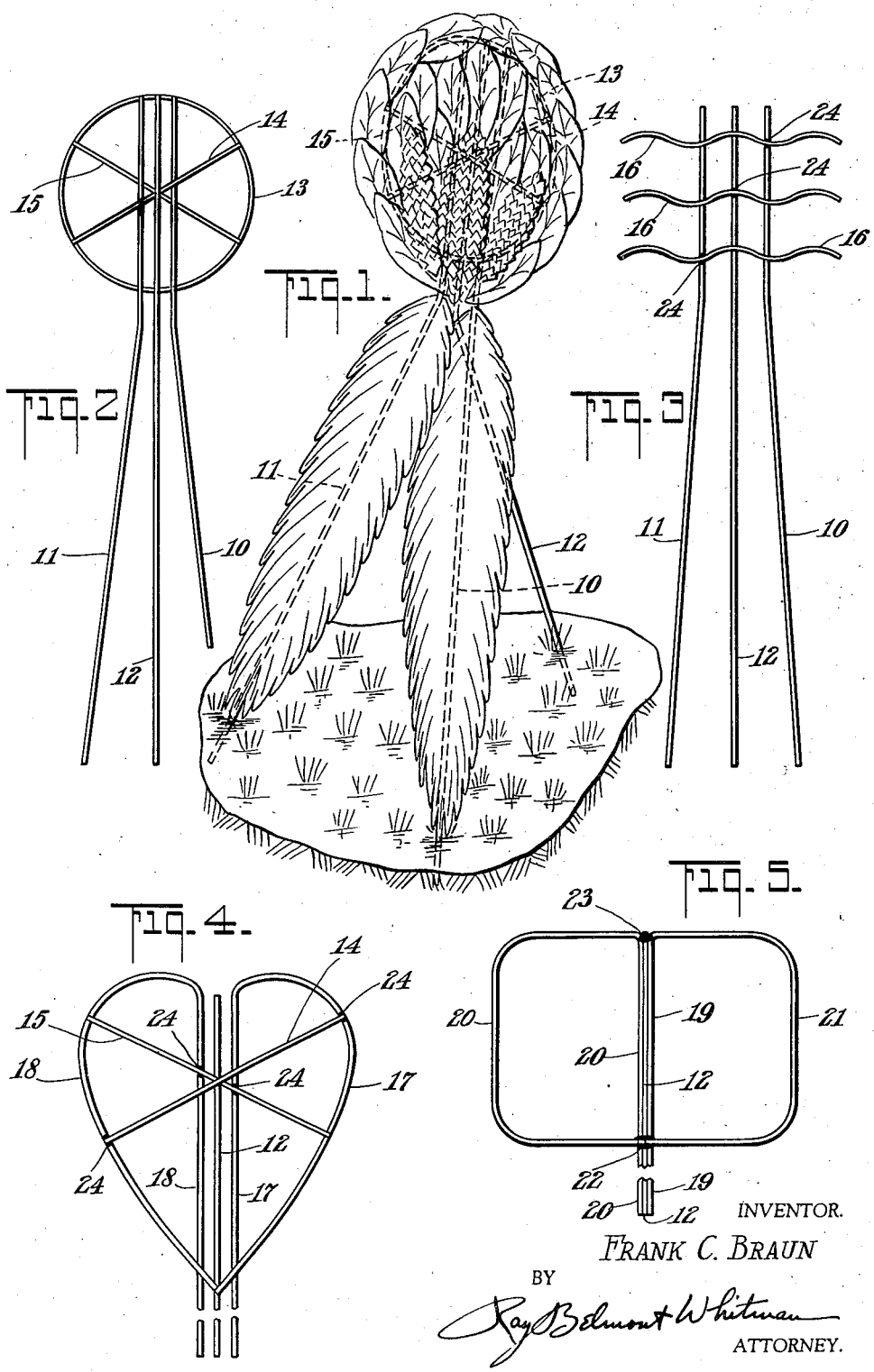
INVENTOR.
FRANK C. BRAUN
BY
Ray Belmont Whitman
ATTORNEY.

Patented Mar. 30, 1937

2,075,006

UNITED STATES PATENT OFFICE 2,075,006

EASEL SPRAY

Frank C. Braun, New York, N. Y.

Application May 11, 1935, Serial No. 20,940

2 Claims. (Cl. 41—12)

This invention relates to easel sprays, and more especially to a simple and inexpensive easel combination adapted for use as a decoration or tribute, principally for mourners in cemeteries.

An object of the invention is to provide a simple and inexpensive easel which can be manufactured for a few cents from wire or like inexpensive material and which is adapted to hold in a substantially upright position a wreath or flower spray, or other decoration or tribute.

Another object is to provide in one unitary object an easel and spray or wreath adapted to be readily mounted on the easel member and also to conceal said easel member behind decorative elements of the wreath or spray.

A further object is to provide a wreath frame with a plurality of fastening points or positions for the stems of flowers and plants, either real or artificial.

Yet another object is to provide an easel which can be manufactured initially with its legs positioned in one plane and one or more of which legs can be bent to a different plane to form the easel, this operation being done by the purchaser of the easel.

All these and other objects as suggested here below are attained by the methods and means now to be described and illustrated in the accompanying drawing, in which—

Figure 1 is a perspective view of an easel spray combination embodying elements of this invention.

Fig. 2 is a front elevational view of the wire or metal structure comprising the easel and the holding frame for the spray or the wreath.

Fig. 3 is a view of a modified form showing a wreath or spray-holding portion at the top of the easel comprising a plurality of corrugated members designed to aid in making more permanent the tying of the spray or wreath onto its easel frame.

Fig. 4 is a further modified front elevational view of another form of the invention showing the frame construction with its easel for a heart-shaped wreath.

And Fig. 5 is a view of a simple form of the invention of Fig. 1 showing how the easel and spray-holding members may be united with a minimum of spot-welding or other holding means.

Like numerals refer to like parts throughout the several views.

In the form shown in Figs. 1 and 2 the invention consists essentially of three wires 10, 11, 12, of bendable material such as soft iron or steel and cut to substantially the same length as shown. Near the top of the three wires, which have previously been placed parallel to each other in spaced relation a similar piece of wire formed into a circle is affixed to the top of the set of wires, this circular member 13 having diametrally-placed cross wires 14, 15 which serve the dual purpose of aiding in affixing the various elements into one unitary article and also of providing a plurality of spaced members on which flower and plant stems may be wired or otherwise held.

The easel is completely formed by the purchaser preferably by simply bending back the middle wire leg 12 near its attachment to the lower portion of circular member 13 when ready to be used. The side legs 10, 11 may also be formed straight or bent in outwardly slanting and diverging directions at the time of manufacture.

The easel spray combination as shown in Fig. 1 may have two palm leaves or other decorations as part of the spray but extending down over the front of the two front legs of the easel as shown. The spray-holding portion at the top may contain a wreath or spray in the form of a plurality of flowers or plants such as pine cones, artificial leaves, or whatnot. These various spray elements as suggested in the drawing are held to the frame and easel legs by any known manner such as the use of wire wound around the stems and wires of the frame.

In the embodiment shown in Fig. 3 the same three spaced easel leg members 10, 11, 12 may be used, the variation being in the wreath or spray frame at the top which consists of a plurality of spaced corrugated or wavy members 16 spot-welded or otherwise fastened to the easel members in substantially parallel relation as shown.

The purpose of the wavy member 16 being shaped as shown is to reduce the tendency of the wire fasteners which hold the wreath and spray members to the frame members from sliding off the ends of the spray members 16.

In the embodiment shown in Fig. 4 the easel consists of wire member 12 flanked by longer wires 17, 18 which are bent around as shown to form a substantially heart-shaped object, the lower ends coming together at the point of the heart and being spot-welded to member 12 or otherwise suitably fastened. Similar cross members 14, 15 to those shown in Fig. 2 may be used in this modified form, being designed not only to hold the various elements together into one article that is substantial and reasonably permanent but also to provide a plurality of spaced points of attachments for the various wreaths and spray members which it may be desired to fasten to this form.

In the form shown in Fig. 5 which is probably the simplest of all, the center wire 12 is flanked by two longer wires 20, 21 bent into a closed figure of any desired shape with their ends meeting at 22 and being welded together and to the under portion of members 20, 21 and also to middle wire 12; also preferably a second spot-weld or like holding means 23 is positioned at the top where the side wires separate from the center wire.

Of course in all these various modifications it is understood that the side legs may be bent outwardly either after being sold or during manufacture so that their lower ends will be spaced from each other a considerable distance to form a stable base for the easel, and that the center wire is made of a material which is also easily bent backwardly as shown in Fig. 1 to form the easel.

Many modifications of the invention are possible but the inventor reserves to himself exclusive rights as set out in the appended claims.

Having now described the invention, what is claimed as new and for which Letters Patent of the United States is desired, is:

1. A support for a decorative assembly, comprising a bendable centrally-disposed member and two side members attached thereto at a plurality of points, the side members each being longer than the centrally-disposed member and being bent in a laterally-extending curve from the last-named member with their ends overlying said last-named member and being fastened thereto and to each other.

2. A wreath support comprising a wreath frame and three bendable leg members rigidly secured thereto and each secured to the frame at a plurality of points and adapted to be separated at their lower ends by bending to permit the frame to be held in a generally upright position.

FRANK C. BRAUN.